(12) United States Patent
Shipley et al.

(10) Patent No.: US 9,100,982 B1
(45) Date of Patent: *Aug. 4, 2015

(54) PROXIMITY-BASED DEVICE SWITCHING

(75) Inventors: Trevor Daniel Shipley, Olathe, KS (US); Louis Eric Wingo, Liberty, MO (US); Cesar Perez, Olathe, KS (US); Robert E. Urbanek, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 211 days.

This patent is subject to a terminal disclaimer.

(21) Appl. No.: 13/027,814

(22) Filed: Feb. 15, 2011

(51) Int. Cl.
  H04B 7/00   (2006.01)
  H04W 80/04  (2009.01)
  H04W 88/08  (2009.01)

(52) U.S. Cl.
  CPC .............. *H04W 80/04* (2013.01); *H04W 88/08* (2013.01)

(58) Field of Classification Search
  CPC ...... H04L 63/08; H04W 12/06; H04W 60/00; H04W 80/04; H04W 88/182; H04W 8/06; H04W 88/02; H04W 12/08; H04W 24/02; H04W 36/0038; H04W 4/001; H04W 4/24; H04W 4/26; H04W 88/04; H04W 8/18; H04W 92/18
  USPC .............. 455/411, 445, 461, 463, 517, 550.1, 455/551
  See application file for complete search history.

(56) References Cited

U.S. PATENT DOCUMENTS

| | | | |
|---|---|---|---|
| 6,999,769 B1* | 2/2006 | Henon | 455/445 |
| 7,155,226 B1 | 12/2006 | Oh et al. | |
| 7,190,969 B1 | 3/2007 | Oh et al. | |
| 7,593,741 B1* | 9/2009 | Amin et al. | 455/462 |
| 7,693,511 B2* | 4/2010 | Bottrich et al. | 455/417 |
| 8,140,065 B2* | 3/2012 | Gonsalves et al. | 455/420 |
| 8,224,307 B2* | 7/2012 | Ray et al. | 455/417 |
| 8,620,311 B2* | 12/2013 | Kojo et al. | 455/433 |
| 2002/0068584 A1* | 6/2002 | Gage et al. | 455/456 |
| 2002/0077129 A1* | 6/2002 | Kikuta et al. | 455/461 |
| 2002/0177472 A1* | 11/2002 | Tomoda et al. | 455/569 |
| 2007/0094490 A1* | 4/2007 | Lohr | 713/153 |
| 2011/0059734 A1* | 3/2011 | Dunne et al. | 455/420 |
| 2011/0271331 A1 | 11/2011 | Adams | |

OTHER PUBLICATIONS

Preinterview First Action Irnterview in U.S. Appl. No. 13/027,812 mailed Oct. 3, 2012, 34 pages.
Non-Final Office Action in U.S. Appl. No. 13/027,818 maled Sep. 17, 2012, 20 pages.
First Action Interview Office Action in U.S. Appl. No. 13/027,812 mailed Oct. 26, 2012, 28 pages.
Non-Final Office Action in U.S. Appl. No. 13/027,812 mailed Feb. 14, 2014.
Final Office Action dated Aug. 18, 2014 in U.S. Appl. No. 13/027,812, 21 pages.

* cited by examiner

*Primary Examiner* — Liton Miah (57) ABSTRACT

A method, system and medium are provided for automatically routing an incoming call to one active wireless-telecommunications device of a set of devices associated with a single wireless-telecommunications-network subscriber. A proximity-based relationship is created between a primary device and a nonprimary device. Upon receiving an indication that the primary device is within a threshold proximity of the nonprimary device, a request is communicated to the network to associate a set of user credentials of the primary device and a set of hardware credentials of the primary device with the nonprimary device. The nonprimary device is thereby activated so that it can receive an incoming call. The primary device is deactivated so that the subscriber can only receive an incoming call on one device at a time.

14 Claims, 11 Drawing Sheets

PROXIMITY-BASED DEVICE SWITCHING

CROSS REFERENCE TO RELATED APPLICATIONS

This application is related by subject matter to two other applications: the first being the U.S. patent application Ser. No. 13/027,818 entitled "Application-Based Device Enablement" and the second being the U.S. patent application Ser. No. 13/027,812 entitled "Proximity-Based Device Switching Using Proxy Credentials" each of which is assigned or under obligation of assignment to the same entity as is this application. Both applications are expressly incorporated by reference herein. The three applications are being filed on the same date.

SUMMARY

A high-level overview of various aspects of the invention are provided here for that reason, to provide an overview of the disclosure and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief and at a high level, this disclosure describes, among other things, ways to automatically route an incoming call to one active device of a set of wireless-telecommunications devices associated with a single wireless-telecommunications-network subscriber. For example, a subscriber may use one device while at work or at home, but may wish to use a built-in car phone with its powerful antennae when traveling in the car. Upon receiving an indication that the work/home device is within a threshold proximity of the car phone, a request is communicated to the network to associate a set of user credentials of the work/home device with the car phone thereby automatically activating it so that it can receive incoming calls. The work/home device is deactivated so that the subscriber can only receive incoming calls from one device at a time.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

AN Access Network
AAA Authentication, Authorization & Accounting Server
BS Base Station
BSC Base Station Controller
CDMA Code Division Multiple Access
ESN Electronic Serial Identifier
GPRS General Packet Radio Service
GIS Geographic Information Services
GSM Global System for Mobile Communications
HA Home Agent
HLR Home Location Register
MEID Mobile Equipment Identifier
MSID Mobile Subscriber Identifier
MSC Mobile Switching Center
NAI Network Access Identifier
PDSN Packet Data Serving Node
RNC Radio Network Controller
TDMA Time Division Multiple Access
VLR Visitor Location Register Further, various technical terms are used throughout this description. An illustrative resource that fleshes out various aspects of these terms can be found in Newton's Telecom Dictionary, 25th Edition (2009).

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Examples of the present invention are directed toward methods, systems, and computer-readable medium for use in enabling a wireless-telecommunications-network subscriber to utilize any of a certain set of wireless-telecommunications devices. In one aspect, the subscriber uses a wireless-telecommunications device (the primary device) but wishes to switch temporarily to another wireless-telecommunications device (the nonprimary device). Upon receiving a request to activate the nonprimary device so that it can receive incoming calls, the network activates the nonprimary device by associating a set of user credentials with the nonprimary device. The primary device is deactivated so that only one device is active at any one time. In another aspect, the request to activate the nonprimary phone is automatically received by the network when the primary device comes within a threshold proximity of the nonprimary device. In a third aspect, the primary device activates the nonprimary device without substantial network involvement by using a secure communication path to transfer a set of user credentials and a set of hardware credentials associated with the primary device to the nonprimary device. This process occurs when the nonprimary device comes within a threshold proximity of the primary device.

Figure 1:
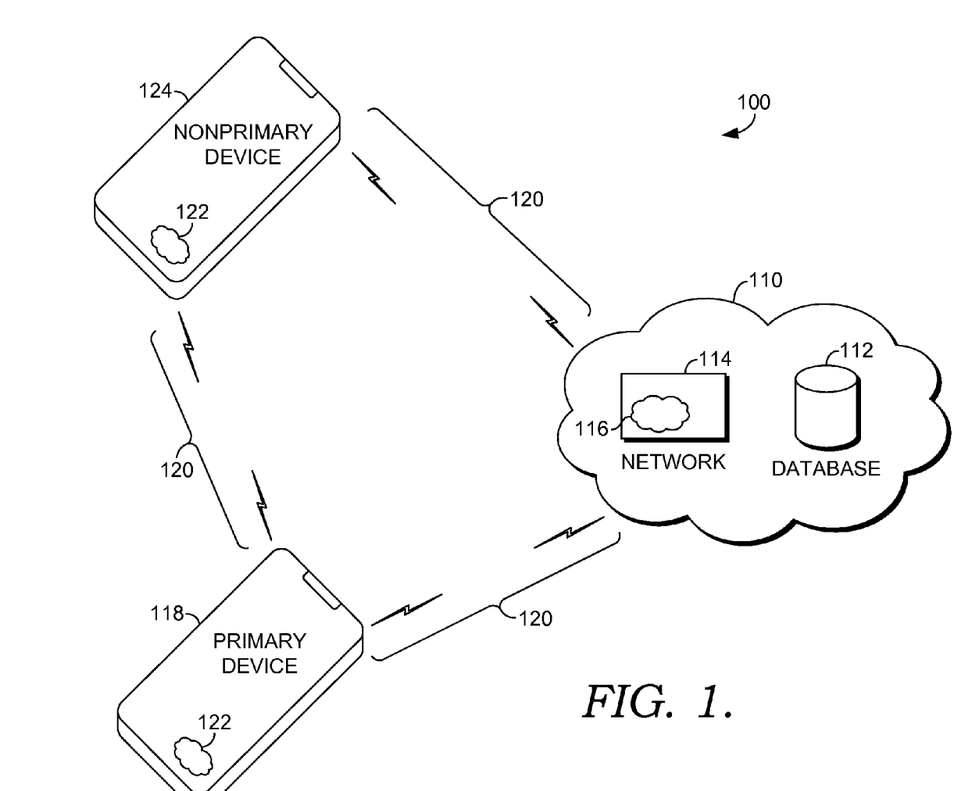
FIG. 1 depicts an illustrative operating environment in accordance with an embodiment of the technology.

Turning now to FIG. 1, an illustrative wireless-telecommunications-network environment is depicted according to one embodiment and is referenced generally by the numeral 100. This embodiment comprises a wireless-telecommunications-network 110 that includes a database 112, a server 114 and a set of embodied computer-executable instructions 116.

Database 112 may be configured to store information or data about a wireless-telecommunications-network subscriber including information such as, for example, user credentials associated with the subscriber, information concerning which wireless devices are registered to the subscriber, and the hardware credentials associated with those registered devices. Although implementation details may differ, the data may be stored in a billing system, and/or some type of authentication component. The authentication component may be what is known in the art as a home location register (HLR) or an Authentication, Authorization, and Accounting (AAA) server. These aspects of the invention will be discussed in more depth below with respect to FIG. 2.

Network 110 can communicate with a primary device 118 and a nonprimary device 124 by way of a wireless-telecommunications link 120. As well, primary device 118 and nonprimary device 124 can communicate with each other through a wireless-telecommunications link 120 such as, for example, a Wi-Fi®, Bluetooth®, a secure communication path, a universal serial bus (USB), and other types of near-field communication methods. Primary device 118 and nonprimary device 124 include a set of embodied computer-executable instructions 122 that carry out various functional aspects of the invention.

Figure 1A:
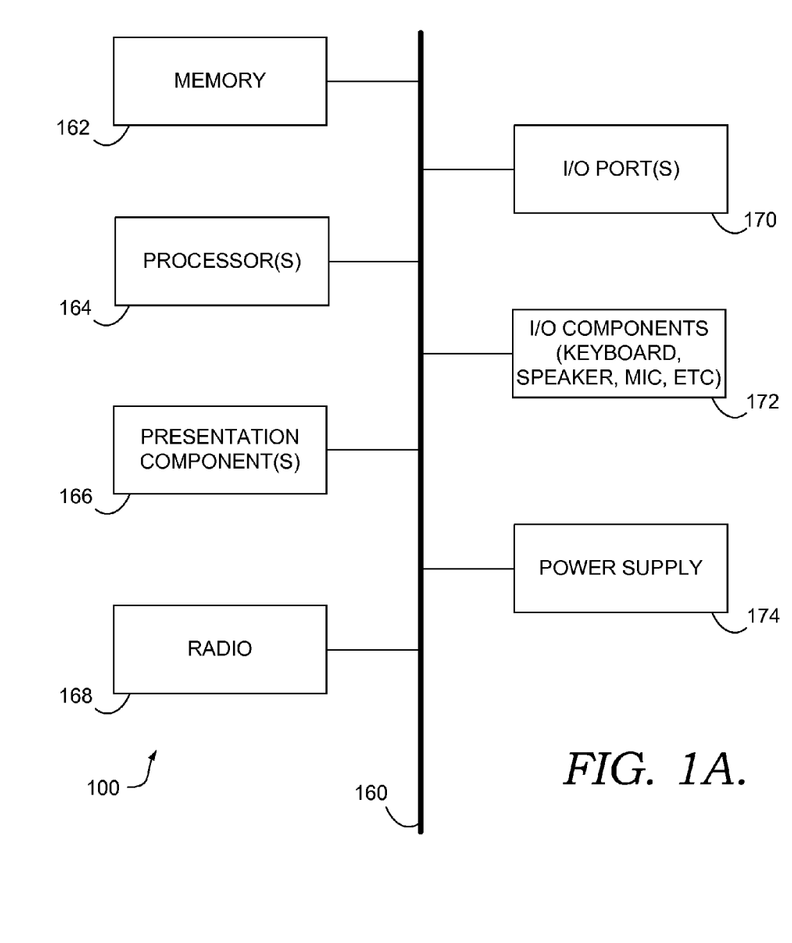
FIG. 1A depicts an exemplary wireless-telecommunications device in accordance with an embodiment of the technology.

Turning now to FIG. 1A, a block diagram of an illustrative communications device according to one embodiment is provided and referenced generally by the numeral 100. Illustrative communications device 100 may include primary device 118 and nonprimary device 124 of FIG. 1. Although some components are shown in the singular, they may be plural. For example, communications device 100 might include multiple processors or multiple radios, etc. As illustratively shown, communications device 100 includes a bus 160 that directly or indirectly couples various components together including memory 162, a processor 164, a presentation component 166, a radio 168, input/output ports 170, input/output components 172, and a power supply 174.

Memory 162 might take the form of memory components previously described. Thus, further elaboration will not be provided here, only to say that memory component 162 can include any type of medium that is capable of storing information (e.g., a database). A database can be any collection of records. In one embodiment, memory 162 includes a set of embodied computer-executable instructions that, when executed, facilitates various aspects disclosed herein. These embodied instructions will variously be referred to as "instructions" or an "application" for short.

Processor 164 might actually be multiple processors that receive instructions and process them accordingly. Presentation component 166 includes the likes of a display, a speaker, as well as other components that can present information (such as a lamp (LED), or even lighted keyboards).

Radio 168 facilitates communication with a wireless-telecommunications-network. Illustrative wireless-telecommunications technologies include CDMA, GPRS, TDMA, GSM, and the like (including what is known in the art as WiMax technology and also Long Term Evolution (LTE)). In some embodiments, radio 168 might also facilitate other types of wireless communications including Wi-Fi®, Bluetooth® communications, GIS communications, and other near-field communications.

Input/output port 170 might take on a variety of forms. Illustrative input/output ports include a USB jack, stereo jack, infrared port, proprietary communications ports, and the like. Input/output components 172 include items such as keyboards, microphones, speakers, touch screens, and any other item usable to directly or indirectly input data into communications device 100. Power supply 174 includes items such as batteries, fuel cells, or any other component that can act as a power source to power communications device 100.

Figure 2:
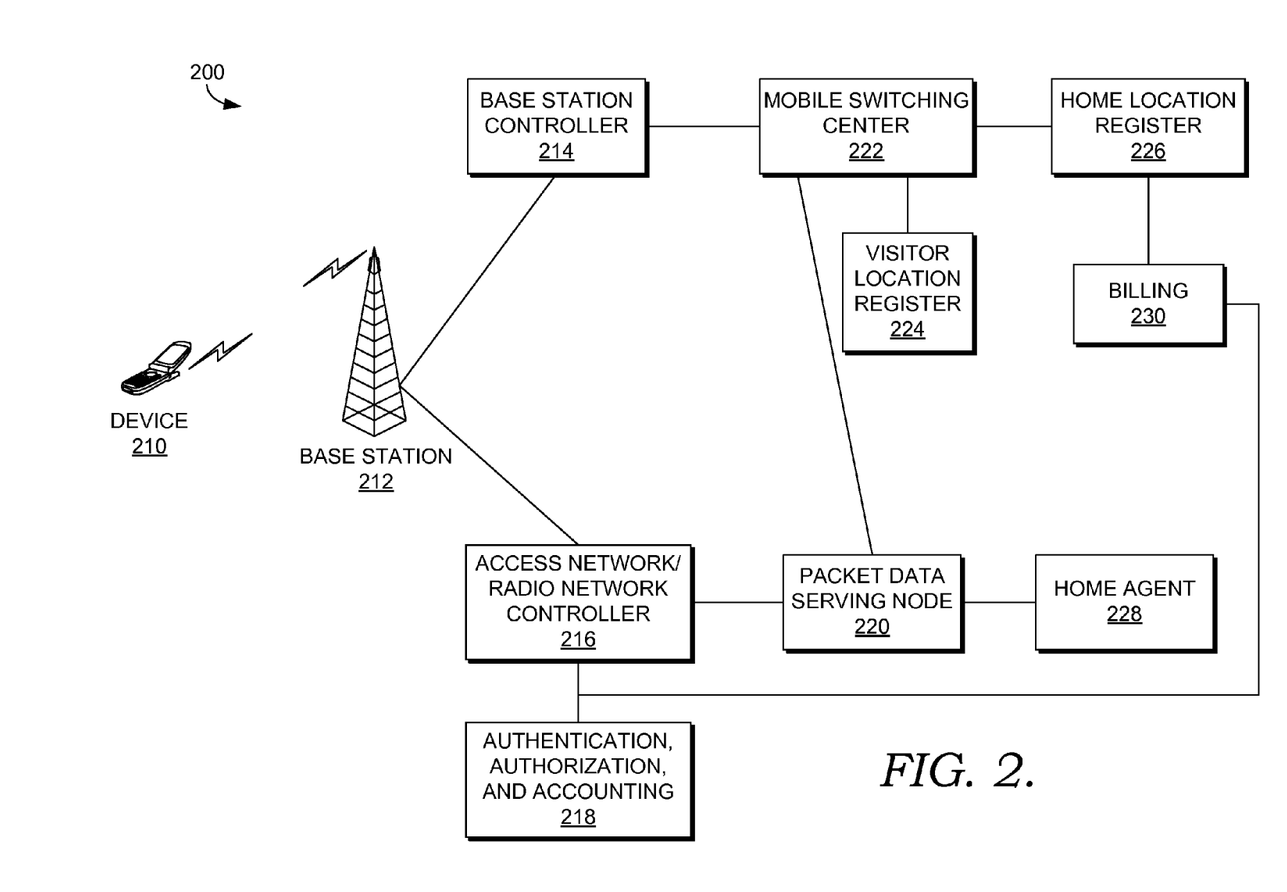
FIG. 2 depicts an illustrative wireless-telecommunications-network suitable for practicing an embodiment of the technology.

Turning now to FIG. 2, an illustrative wireless-telecommunications-network environment according to one embodiment of the technology is provided and referenced generally by the numeral 200. Network environment 200 may comprise a wireless-telecommunications device 210, such as primary device 118 and nonprimary device 124 of FIG. 1, a base station (BS) 212, a base station controller (BSC) 214, an Access Network/Radio Network Controller (AN/RNC) 216, an authentication, authorization, and accounting server (AAA) 218, a mobile switching center (MSC) 222, a visitor location register (VLR) 224, a packet data serving node (PDSN) 220, a home location register (HLR) 226, a home agent (HA) 228, and a billing component 230. Mobile device 210 was described in detail above and, therefore, will not be described further.

The following discussion regarding FIG. 2 is geared toward providing a high-level overview of an illustrative network environment in order to help the reader better understand the claimed invention. With this in mind, BS 212 is a fixed station used for communicating with wireless-telecommunication devices such as mobile device 210, while BSC 214 supervises the functioning and control of multiple BSs 212. AN/RNC 216 functions as an entry point for an individual wireless-telecommunications-network subscriber to access the network.

AAA 218 is a framework for network management and security that controls access to resources by identifying subscribers, authorizing service, and tracking subscriber usage of resources. AAA 218 typically interacts with network access points such as AN/RNC 216 as well as databases that contain user information such as HLR 226. AAA 218 may also interact with billing component 230. AAA 218, in one example, may be database 112 of FIG. 1. PDSN 220 acts as a connection point between AN/RNC 216 and the Internet (not shown).

Still further with respect to FIG. 2, MSC 222 acts to route calls to other wireless subscribers or to landlines, while VLR 224 is a local database maintained by the cellular provider in whose territory the subscriber is roaming. HLR 226 is used to identify/verify a subscriber; it also contains subscriber data related to features and services. HLR 226 is used not only when a subscriber makes a call within the area of network coverage, but also when the subscriber is roaming outside of the area of network coverage. In one aspect, HLR 226 may communicate with billing component 230. HLR 226 may be database 112 of FIG. 1. HA 228 facilitates the delivery of Internet data packets to nomadic users at remote locations. Finally, billing component 230 serves a management function by keeping track of subscriber usage of network resources. Billing component 230 communicates with both AAA 218 and HLR 226. Billing component 230 may, in one embodiment, comprise a server (not shown). This server may activate a nonprimary device belonging to a subscriber and deactivate a primary device belonging to the subscriber. This activation/deactivation process is facilitated by communication with AAA 218 and HLR 226. In another aspect, billing component 230 communicates with a provisioning system (not shown) to facilitate the provisioning of a new phone to the network. These processes will be explained in more depth below.

The illustrative network environment 200 shown in FIG. 2 is merely an example of one suitable networking environment and is not intended to suggest any limitation as to the scope of use or functionality of embodiments of the present invention. Neither should the network environment 200 be interpreted as having any dependency or requirement related to any single module/component or combination of modules/components illustrated therein. Further, although lines are depicted between some of the components, these lines are not intended to suggest any limitation as to the scope of use or functionality of embodiments of the present invention. The components depicted in FIG. 2 may communicate with each other through hard-wired connections or through wireless connections.

As a preface to the more detailed discussions below, some general information is provided regarding how a device, such as primary device 118 or nonprimary device 124 of FIG. 1, is provisioned or loaded onto a wireless-telecommunications-network. In its native state, a device has a set of manufacturer-assigned credentials that includes a network access identifier password (NAI/PWD) and a mobile subscription identifier (MSID). These are known as Profile 0 credentials and are designated as $NAI/PWD_0$ and $MSID_0$. At some point, such as when a subscriber purchases the device or when the device is sold to a retail outlet, the set of manufacturer-assigned credentials is electronically transferred to a network, such as network 110 of FIG. 1, and stored in a database, such as database 112 of FIG. 1. At this point the device is provisioned, and a user of the device would have access to the provisioning system of the network. This allows the user to place an emergency call on the provisioned phone but does not allow the user to receive an incoming call. In addition, the provisioned phone is able to request to be activated so that it can receive incoming calls—a process that will be explained in greater depth below.

When a subscriber purchases a device, such as primary device 118 of FIG. 1, and sets up an account, the subscriber is assigned an NAI/PWD and an MSID that are downloaded from the network to the device. These user credentials are designated as $NAI/PWD_1$ and $MSID_1$. These user credentials are stored in a database, such as database 112 of FIG. 1. A unique set of hardware credentials is associated with the device. The hardware credentials may include an electronic serial number/mobile equipment identifier (ESN/MEID), an access network-authentication, authorization, and accounting identifier (AN-AAA ID), and an AN-AAA Password (AN-AAA PWD). These hardware credentials are also stored in the database and are related to the user credentials in the database. Given this background, a more detailed description of the present invention follows.

A. Application-Based Device Enablement

In one embodiment, our technology enables a wireless-telecommunications-network subscriber who is using a wireless-telecommunications device (the primary device) to temporarily switch to another wireless-telecommunications device (the nonprimary device). Upon receiving a request to activate the nonprimary device so that it can receive incoming calls, the network activates the nonprimary device by associating a set of user credentials with the nonprimary device. The primary device is deactivated so that only one device is active at any one time.

Figure 3:
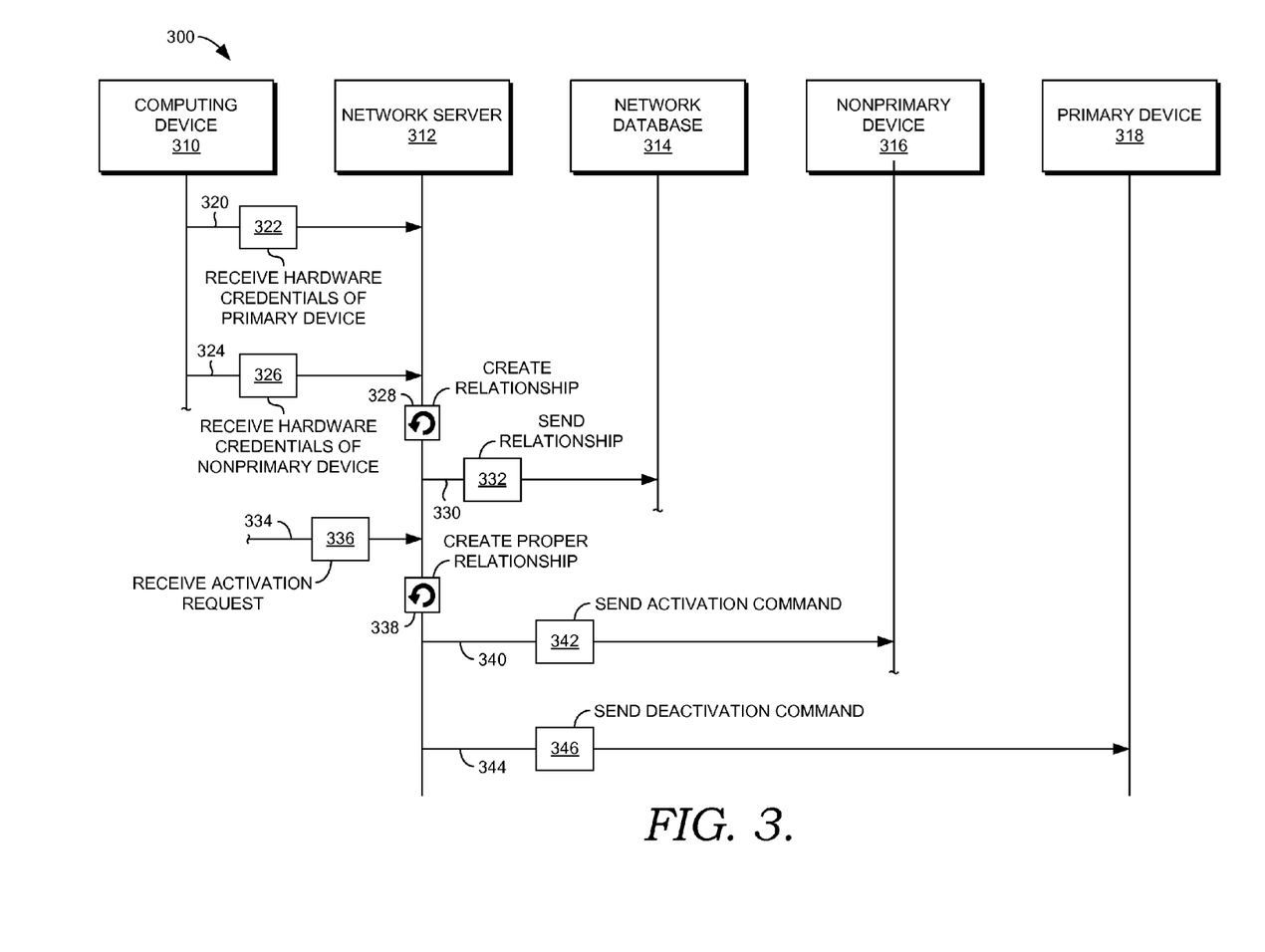
FIG. 3 depicts an illustrative process-flow diagram that depicts a method for enabling a wireless-telecommunications-network subscriber to use any of a certain set of multiple devices according to an embodiment of the technology.

Turning now to FIG. 3, a process-flow diagram, referenced generally by the numeral 300, is depicted illustrating a method for enabling a wireless-telecommunications-network subscriber to use any of a certain set of multiple devices. FIG. 3 includes a computing device 310, a network server 312, a network database 314, a nonprimary device 316, and a primary device 318.

Primary device 318 and nonprimary device 316 may be any type of wireless-telecommunications device. Such devices may include any type of fixed, mobile, and portable devices including cellular telephones, personal digital assistants, and devices that are built into automobiles, televisions, computers, and other types of smart appliances. Primary device 318 and nonprimary device 316 may correspond to primary device 118 and nonprimary device 124 of FIG. 1. Network server 312 may correspond to billing component 230 of FIG. 2, while network database 314 may correspond to HLR 226 and/or AAA 218 of FIG. 2. Computing device 310 may be any general type of computing device known in the art and, thus, will not be explained further.

At a step 320, a first set of hardware credentials 322 for primary device 318 is received by network server 312 from computing device 310. In one aspect, first set of hardware credentials 322 comprises a first identifier that is used to uniquely identify primary device 318. The first identifier may include one or more of an ESN, an MEID, an AN-AAA ID, and an AN-AAA PWD. At a step 324, a second set of hardware credentials 326 for nonprimary device 316 is received by network server 312 from computing device 310. In one aspect, second set of hardware credentials 326 comprises a second identifier that is used to uniquely identify nonprimary device 316. The second identifier may include one or more of an ESN, an MEID, an AN-AAA ID, and an AN-AAA PWD.

At a step 328, a first relationship is created between a set of user credentials and first set of hardware credentials 322 for primary device 318. In one aspect, the set of user credentials comprises an MSID and an NAI/PWD that are assigned to the subscriber upon purchasing primary device 318, downloaded to primary device 318, and stored in network database 314. At step 328, a second relationship is created between the set of user credentials and second set of hardware credentials 326 for nonprimary device 316. In a real-world example, this might occur when a subscriber is already in possession of one device, such as primary device 318, but desires to use a second device, such as nonprimary device 316, for a different purpose. For example, one device may be used for day-to-day life, while the other device may be used for traveling. Other examples include a work phone and a home phone, a mobile phone and a car phone, or a mobile phone and a built-in phone on a smart appliance such as a television or a computer. It is to be understood that a plurality of relationships can be created between the set of user credentials and the hardware credentials of a plurality of different nonprimary devices. Thus, a subscriber is not simply limited to a primary device and a nonprimary device, but could have a primary device and any number of nonprimary devices.

At a step 330, the first and second relationships 332 are stored in network database 314. In one aspect, network database 314 is configured to store a plurality of relationships between the set of user credentials and the hardware credentials of a plurality of different nonprimary devices.

At a step 334, an activation request 336 is received by network server 312. Activation request 336 may be received from a user-interface on primary device 318, a user-interface on nonprimary device 316, a computer-based application, or a website. These examples are not meant to be limiting, and it is to be understood that the activation request may be received from a variety of different modalities.

At a step 338, while maintaining the first relationship outlined above, network server 312 creates a proper relationship by associating the set of user credentials with the second set of hardware credentials 326 of nonprimary device 316. In one embodiment, the first relationship is simply preserved without requiring any affirmative action. The set of user credentials may be retrieved from network database 314 before they are associated with the second set of hardware credentials of nonprimary device 316.

At a step 340, an activation command 342 is sent to nonprimary device 316, where activation command 342 activates nonprimary device 316 such that it is capable of receiving incoming calls. Activation of nonprimary device 316 may include enabling functionality beyond an ability to receive incoming voice calls. For example, additional functionality may include one or more of the following: establishing data sessions, browsing the Internet, sending data to remote entities, and receiving data from remote entities.

At a step 344, in one aspect, a deactivation command 346 is sent to primary device 318 such that it can no longer receive incoming calls. In one aspect, either primary device 318 or nonprimary device 316 is active at any one time. In yet another aspect, deactivation command 346 is sent once the user credentials are associated with second set of hardware credentials 326 of nonprimary device 316.

Figure 3A:
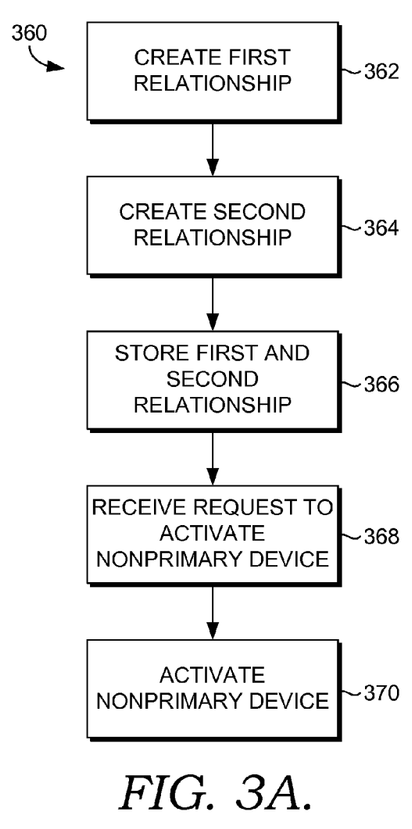
FIG. 3A depicts an illustrative flow diagram that depicts a method for enabling a wireless-telecommunications-network subscriber to use any of a certain set of multiple devices according to an embodiment of the technology.

FIG. 3A depicts a flow diagram, referenced generally by the numeral 360, illustrating a method of enabling a wireless-telecommunications-network subscriber to use any of a certain set of multiple devices. At a step 362, a first relationship is created between a set of user credentials and a first set of hardware credentials of a primary device. At a step 364, a second relationship is created between the set of user credentials and a second set of hardware credentials of a nonprimary device. At a step 366, the first and second relationships are stored in a database, while at a step 368, a request is received to activate the nonprimary device. At a step 370, the nonprimary device is activated by associating the set of user credentials with the second set of hardware credentials of the nonprimary device.

The methods outlined above are applicable for options for activating a second nonprimary device and deactivating nonprimary device 316. In this aspect, a third relationship may be created between the set of user credentials and a third set of hardware credentials of a second nonprimary device. A request is received to activate the second nonprimary device, and the second nonprimary device is activated by associating the set of user credentials with the third set of hardware credentials of the second nonprimary device such that the second nonprimary device is capable of receiving incoming calls. The nonprimary device 316 is deactivated such that it cannot receive an incoming call.

In yet another aspect, a request may be received to reactivate primary device 318. The request may be received from at least one of a user-interface on primary device 318, a user-interface on nonprimary device 316, or a computer-based application. Upon receiving the request, the network retrieves the user credentials from network database 314 and associates them with first set of hardware credentials 322 of primary device 318. Primary device 318 is now activated such that a subscriber can receive an incoming call. Nonprimary device 316 is deactivated.

Figure 4:
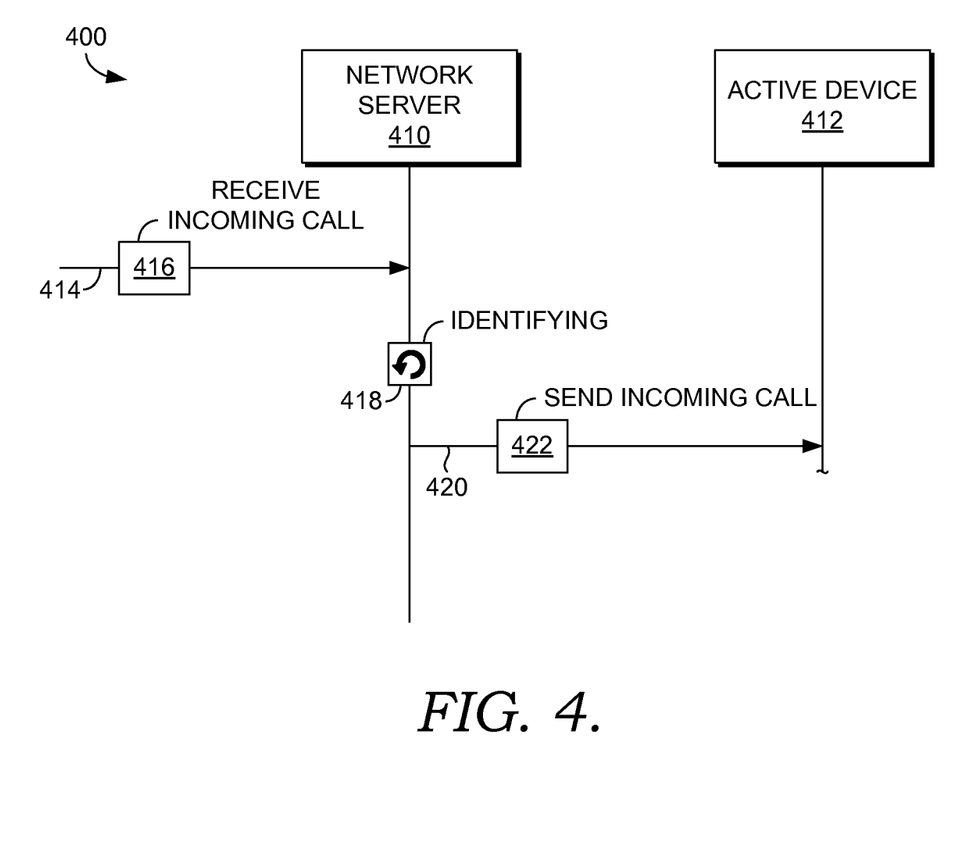
FIG. 4 depicts an illustrative process-flow diagram that depicts a method for routing an incoming call to one active device of a set of devices associated with a single wireless-telecommunications-network subscriber according to an embodiment of the technology.

Turning now to FIG. 4, referenced generally by the numeral 400, a process-flow diagram is depicted illustrating a method for routing an incoming call to one active device of a set of wireless-telecommunications devices associated with a single wireless-telecommunications-network subscriber. FIG. 4 depicts a network server 410 and an active device 412. Network server 410 may correspond to billing component 230 of FIG. 2, while active device may correspond to primary device 118 and/or nonprimary device 124 of FIG. 1. At a step 414, an incoming call 416 is received by network server 410. Incoming call 416 is to be directed to one active device of a set of related devices. The set of related devices are all concurrently related to a single set of user credentials, where the single set of user credentials uniquely indentify the subscriber. Also, only one of the related devices can be in an active state, where an active state is defined as being capable of receiving incoming call 416.

At a step 418, active device 412 within the set of mobile devices is identified, where active device 412 is in an active state. At a step 420, incoming call 422 is sent to active device 412. In one aspect, active device 412 is identified by accessing a database, such as HLR 226 and/or AAA 218 of FIG. 2, which stores the relationships between the set of related devices and the single set of user credentials. After accessing the database, it is determined which device of the set of devices is associated with the single set of user credentials. The device that is associated with the single set of user credentials is the active device. It is important to note that only one device is associated with the single set of user credentials at any one time.

Figure 5:
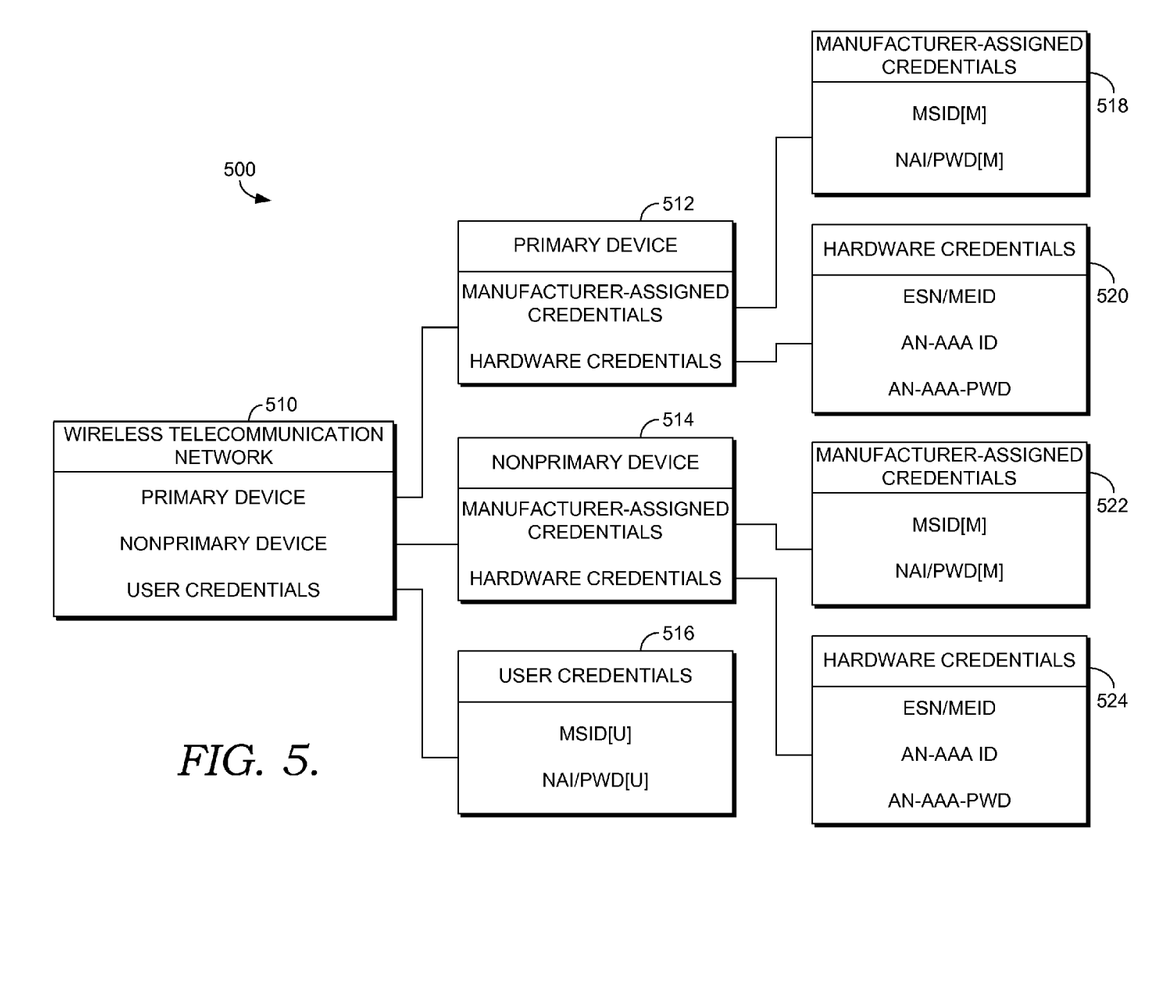
FIG. 5 depicts an illustrative data structure suitable for storing data representing relationships between a primary device, a nonprimary device, and a set of user credentials for a wireless-telecommunications-network subscriber according to an embodiment of the technology.

Turning now to FIG. 5, an exemplary data structure 500 is shown representing the relationship between a primary device, a nonprimary device, and a set of user credentials for a wireless-telecommunications-network subscriber. This data structure is illustrative and exemplary in nature and is not meant to be limiting in any way. The purpose of FIG. 5 is to portray concepts and relationships between various data elements and not the actual arrangement of data in a database.

As shown in table 510, a first relationship is depicted between the set of user credentials and a first identifier that uniquely identifies the primary device. As can be seen from table 512, the first identifier for the primary device may include a set of manufacturer-assigned credentials and a set of hardware credentials. As illustrated in table 518, the set of manufacturer-assigned credentials may comprises an MSID (MSID[M]) and an NAI/PWD (NAI/PWD[M]). As shown in table 520, the set of hardware credentials may comprises an ESN/MEID, an AN-AAA ID, and an AN-AAA PWD. The set of user credentials 516 may comprises an MSID (MSID[U]) and an NAI/PWD (NAI/PWD[U]) that are assigned by the network when a subscriber sets up an account. In one aspect, the first relationship indicates that the primary device is capable of receiving an incoming call when the set of user credentials is associated with the set of hardware credentials.

Continuing on with respect to FIG. 5, a second relationship is also depicted in table 510 between the set of user credentials and a second identifier that uniquely identifies the nonprimary device. As can be seen from table 514, the second identifier for the nonprimary device may include a set of manufacturer-assigned credentials and a set of hardware credentials. As shown in table 522, the set of manufacturer-assigned credentials may comprises an MSID (MSID[M]) and an NAI/PW (NAI/PWD[M]). As shown in table 524, the set of hardware credentials may comprises an ESN/MEID, an AN-AAA ID, and an AN-AAA PWD. In one aspect, the second relationship indicates that the nonprimary device is not capable of receiving an incoming call when the set of hardware credentials is not associated with the set of user credentials.

In conclusion, application-based device enablement enables a subscriber to request that the network activate a second device. This is accomplished by associating a set of user credentials with the hardware credentials of the device to be activated. The creation of this association activates the device allowing it to receive incoming calls.

B. Proximity-Based Device Switching

Figure 6:
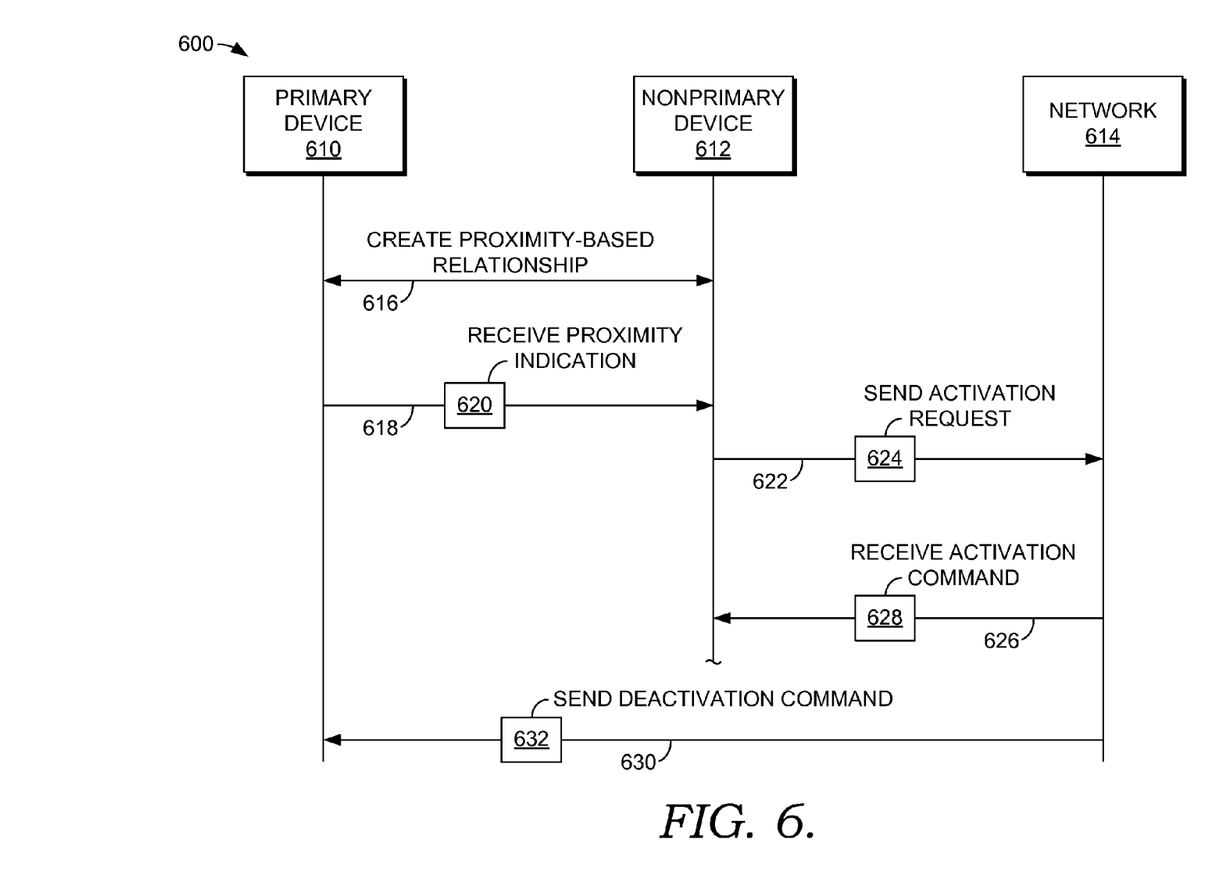
FIG. 6 depicts an illustrative process-flow diagram that depicts a method for automatically routing an incoming call to one active device of a set of devices associated with a single wireless-telecommunications-network subscriber according to an embodiment of the technology.

In one embodiment, our technology leverages near-field communication technology to automatically route incoming calls to one active device of a set of wireless-telecommunications devices associated with a single wireless-telecommunications-network subscriber. FIG. 6 is a process-flow diagram, referenced generally by the numeral 600, that illustrates a method to perform this process. FIG. 6 depicts a primary device 610, a nonprimary device 612, and a network 614.

Primary device 610 and nonprimary device 612 may be any type wireless-telecommunications device. Such devices may include any type of fixed, mobile, and portable devices including cellular telephones, personal digital assistants, and devices that are built into automobiles, televisions, computers, and other types of smart appliances. Primary device 610 and nonprimary device 612 may correspond to primary device 118 and nonprimary device 124 of FIG. 1. Network 614 may correspond to billing component 230 of FIG. 2. These components correspond to the components discussed above with reference to FIGS. 3-4.

Turning back to FIG. 6, at a step 616 a proximity-based relationship is created between primary device 610 and nonprimary device 612. In one aspect, this relationship utilizes short-range wireless radio-frequency communication such as Wi-Fi®, Bluetooth®, and other types of near-field communication. The proximity-based relationship may be created by network 614, or it may be created by a communication between primary device 610 and nonprimary device 612 without network involvement. It should be understood that a plurality of proximity-based relationships may be created between primary device 610 and a plurality of nonprimary devices.

Continuing on with respect to FIG. 6, at a step 618, nonprimary device 612 receives an indication 620 that primary device 610 is within a threshold proximity of nonprimary device 612. Indication 620 may be received from primary device 610 or from nonprimary device 612. In one aspect, the threshold proximity is between 1 meter and 15 meters. Incident to receiving indication 620 that primary device 610 is within the threshold proximity of nonprimary device 612, at a step 622, an activation request 624 is communicated that is useable by network 614 to activate nonprimary device 612 so that it can receive incoming calls. In one aspect, activation request 624 is communicated from nonprimary device 612 to network 614. In another aspect, activation request 624 may be communicated from primary device 610 to network 614. Activation request 624 is a request to associate a set of user credentials of primary device 610 with nonprimary device 612.

At a step 626, an activation command 628 is sent from network 614 to nonprimary device 612. Activation command 628 activates nonprimary device 612 such that it is capable of receiving an incoming call. In one aspect, activation command 628 enables functionality beyond that of receiving an incoming call. For example, additional functionality may include establishing data sessions, browsing the Internet, sending data to remote entities, receiving data from remote entities, and the like.

Continuing, at a step 630, a deactivation command 632 is sent from network 614 to primary device 610. Deactivation command 632 deactivates primary device 610 so that it cannot receive an incoming call. Deactivation command 632, in one aspect, is sent once the set of user credentials of primary device 610 are associated with nonprimary device 612. Either primary device 610 or nonprimary device 612 is active at any one time.

To elaborate further with respect to how nonprimary device 612 is activated, in one aspect, the set of user credentials of primary device 610 is related to a first set of hardware credentials of primary device 610. This relationship may be stored in a database such as, for example, HLR 226 and/or AAA 218 of FIG. 2. As mentioned above, nonprimary device 612 is activated when the set of user credentials is associated with a second set of hardware credentials of nonprimary device 612. This association may occur while maintaining the relationship between the user credentials and the first set of hardware credentials of primary device 610.

Continuing on with respect to the method outlined in FIG. 6, when the currently active nonprimary device 612 is no longer within a threshold proximity of the currently deactivated primary device 610, a request may be communicated to associate the user credentials of nonprimary device 612 with primary device 610. In one aspect, this request may be communicated from primary device 610 to network 614. In another aspect, this request may be communicated from nonprimary device 612 to network 614. The request may be useable by network 614 to reactivate primary device 610 so that it may receive incoming calls by associating the set of user credentials with primary device 610. Nonprimary device 612 is deactivated so that it cannot receive incoming calls.

Figure 6A:
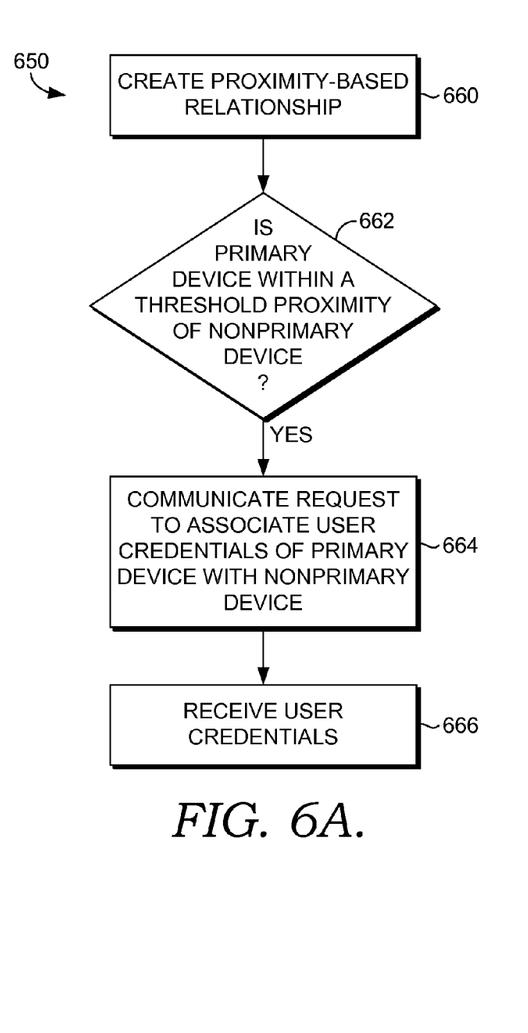
FIGS. 6A-6B depict an illustrative flow diagram that depicts a method for automatically routing an incoming call to one active device of a set of devices associated with a single wireless-telecommunications-network subscriber according to an embodiment of the technology.

FIG. 6A depicts a flow diagram, referenced generally by the numeral 650, that illustrates a method for automatically routing an incoming call to one active device of a set of devices associated with a single wireless-telecommunications-network subscriber. At a step 660, a proximity-based relationship is created between a primary device and a nonprimary device; while at a step 662, it is determined whether the primary device is within a threshold proximity of the nonprimary device. If so, a request is communicated at a step 664 to associate a set of user credentials of the primary device with the nonprimary device. No action is taken if it is determined at step 662 that the primary device is not within a threshold proximity of the nonprimary device. At a step 666, the nonprimary device receives the user credentials thereby enabling it so that it can receive an incoming call.

Figure 6B:
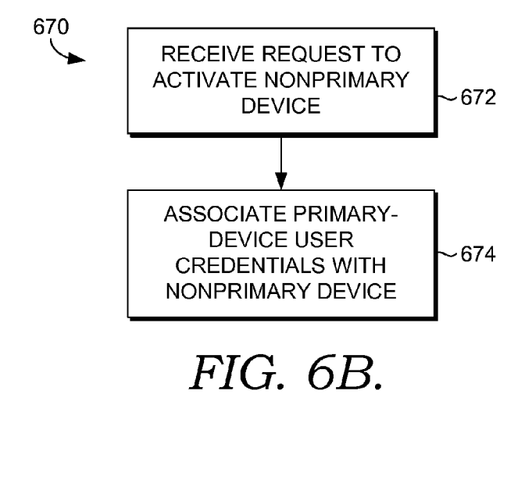

FIG. 6B depicts a flow diagram, referenced generally by the numeral 670, that illustrates a method of enabling a wireless-telecommunications-network subscriber to automatically receive calls on any of a certain set of multiple devices in accordance with an embodiment of the present invention. At a step 672, a request to activate a nonprimary device is received by the network. The request stems from the nonprimary device coming within a threshold proximity of a primary device. At a step 674, the network associates a set of primary-device user credentials with the nonprimary device thereby activating the nonprimary device so that it is capable of receiving an incoming call.

In conclusion, proximity-based device switching enables a subscriber to automatically route calls to a nonprimary device by leveraging near-field communication technology. When a primary device comes within a threshold proximity of the nonprimary device, the nonprimary device communicates an activation request to a network. Upon receiving the request, the network associates a set of primary-device user credentials with a set of nonprimary-device hardware credentials thereby activating the nonprimary device so that it can receive incoming calls.

C. Proximity-Based Device Switching Using Proxy Credentials

In one embodiment, our technology utilizes near-field communication technology to communicate a set of user credentials and a set of hardware credentials from a primary device to a nonprimary device in order to activate the nonprimary device. This process occurs outside of any substantial wireless-telecommunications-network involvement and enables a subscriber to receive an incoming call on the nonprimary device.

Figure 7:
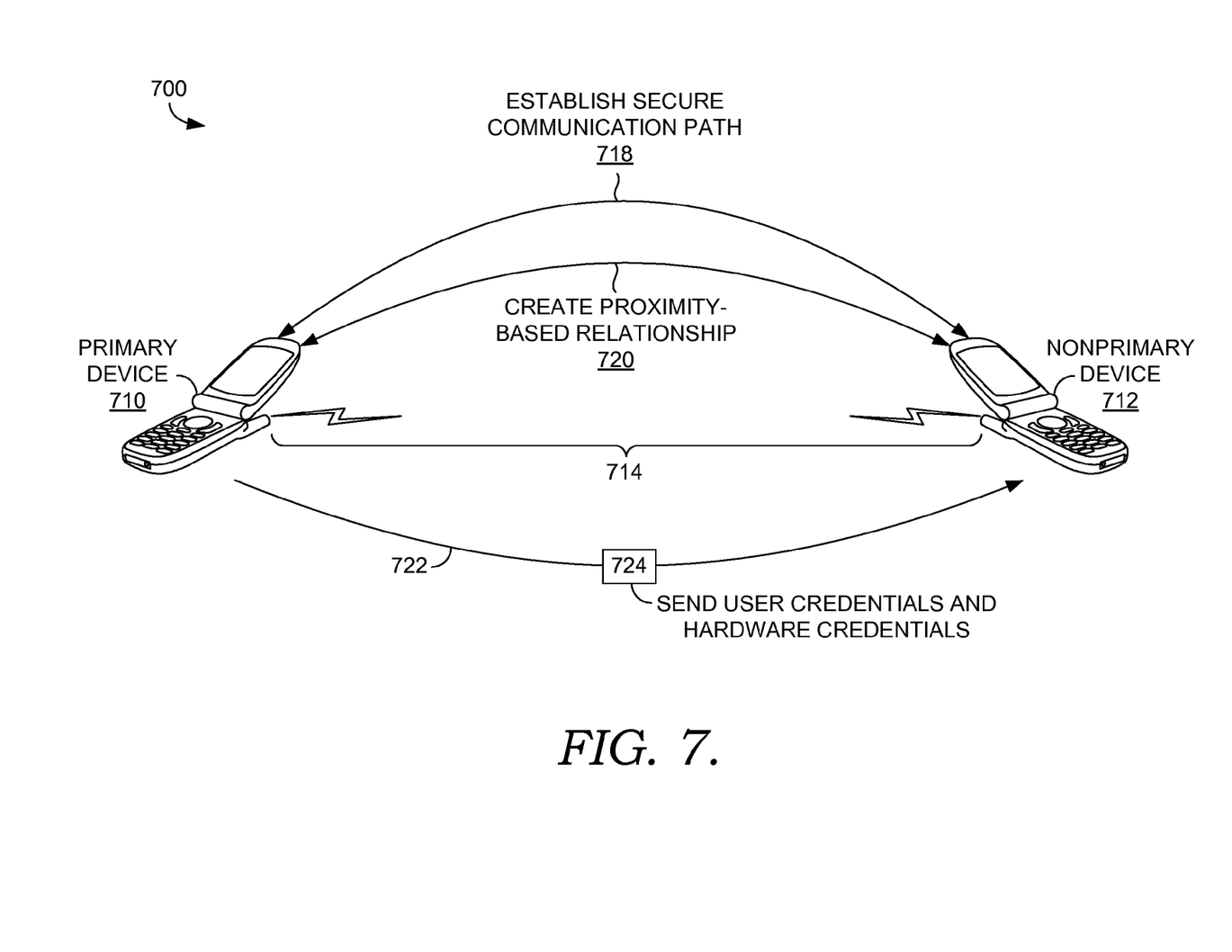
FIG. 7 depicts an illustrative process-flow diagram that depicts a method for receiving an incoming call on a target device according to an embodiment of the technology.

FIG. 7 is a process-flow diagram, referenced generally by numeral 700, which depicts a method for receiving an incoming call on a target device. FIG. 7 depicts a primary device 710 and a nonprimary device 712. Primary device 710 and nonprimary device 712 may be any type of wireless-telecommunications device. Such devices may include any type of fixed, mobile, and portable devices including cellular telephones, personal digital assistants, and devices that are built into automobiles, televisions, computers, and other types of smart appliances. Primary device 710 and nonprimary device 712 may correspond to primary device 118 and nonprimary device 124 of FIG. 1. As well, FIG. 7 depicts a communication link 714 between primary device 710 and nonprimary device 712. Communication link 714 may be hard-wired or wireless and may comprise Wi-Fi®, Bluetooth®, a USB connection, a secure communication path, and the like.

Continuing on with respect to FIG. 7, at a step 718, a secure communication path is established between primary device 710 and nonprimary device 712. In one aspect, the communication path is secured through an encryption method utilizing preshared key technology, or what is known in the art as a shared secret. A shared secret is a piece of data in a secure communication. The piece of data is known only to the parties involved, in this case the primary device 710 and the nonprimary device 712. The shared secret can be a password, a phrase, a number, or any combination of the above. In one aspect, the shared secret is shared between primary device 710 and nonprimary device 712 before any credentials are communicated from primary device 710 to nonprimary device 712. It is to be understood that a number of different encryption methods suitable for wireless-telecommunications devices may be used to secure the communication path between primary device 710 and nonprimary device 712. In addition, a plurality of secure communication paths may be established between primary device 710 and a plurality of nonprimary devices.

Still further with respect to FIG. 7, at a step 720, a proximity-based relationship is created between primary device 710 and nonprimary device 712. In one aspect, this relationship utilizes short-range wireless radio-frequency communication such as Wi-Fi®, Bluetooth®, and other types of near-field communication. The proximity-based relationship may be created by a communication between primary device 710 and nonprimary device 712 through, for example, communication link 714. In one aspect, a plurality of proximity-based relationships are created between primary device 710 and a plurality of nonprimary devices.

At a step 722, primary device 710 communicates to nonprimary device 712 a set of proxy user credentials 724 and a set of proxy hardware credentials 724. Both user credentials 724 and hardware credentials 724 are associated with primary device 710. This communication occurs when nonprimary device 712 comes within a threshold proximity of primary device 710, and, in one aspect, occurs automatically when nonprimary device 712 comes within the threshold proximity of primary device 710. In one aspect, the threshold proximity is between 1 meter and 15 meters. The communication occurs through the secure communication path established at step 718.

In one aspect, user credentials 724 comprise a mobile subscriber identifier and a network access identifier assigned by a wireless-telecommunications-network (the network). Hardware credentials 724 comprise a unique identifier that uniquely identifies the primary device. The identifier may include one or more of an electronic serial number, a mobile equipment identifier, and a network-assigned username and password. User credentials 724 and hardware credentials 724 may, in one aspect, be stored in a network database such as HLR 226 and/or AAA 218 of FIG. 2.

User credentials 724 and hardware credentials 724 of primary device 710 may be recognized by the network as being associated with primary device 710. The network may recognize primary device 710 as having a radio such as, for example, radio 168 of FIG. 1A. As mentioned above, the radio facilitates communication with the network. For example, when enabled the radio may be used for receiving an incoming call from the network. Likewise, when the radio is disabled, primary device 710 can no longer communicate with the network and is not able to receive incoming calls. By contrast, the network may not yet recognize nonprimary device 712 because nonprimary device 712 lacks any credentials recognized by the network.

Returning to the process depicted in FIG. 7, upon receiving user credentials 724 and hardware credentials 724 sent by primary device 710, nonprimary device 712 is activated such that it can receive an incoming call. In one aspect of the invention, nonprimary device 712 may be activated such that it can establish data sessions, browse the Internet, send data to remote entities, and receive data from remote entities. Primary device 710 is deactivated such that it cannot receive an incoming call. Either primary device 710 or nonprimary device 712 may be active at any one time, and, in one aspect, primary device 710 becomes inactive after user credentials 724 and hardware credentials 724 are communicated to nonprimary device 712. In one aspect of the invention, primary device 710 is deactivated by disabling the primary-device radio. The practical effect of disabling the radio is to prevent the network from recognizing two devices with the same set of credentials. This is important because even though primary device 710 communicates proxy user credentials 724 and proxy hardware credentials 724 to nonprimary device 712, primary device 710 retains a copy of these credentials.

In another embodiment of the invention, once primary device 710 is no longer within a threshold proximity of nonprimary device 712, the primary-device radio is enabled so that primary device 710 can communicate with the network and receive incoming calls. Nonprimary device 712 is deactivated so that it cannot receive incoming calls. Still further with respect to this aspect of the invention, nonprimary device 712 does not retain a copy of the proxy user credentials 724 or the proxy hardware credentials 724 once it is deactivated.

Figure 7A:
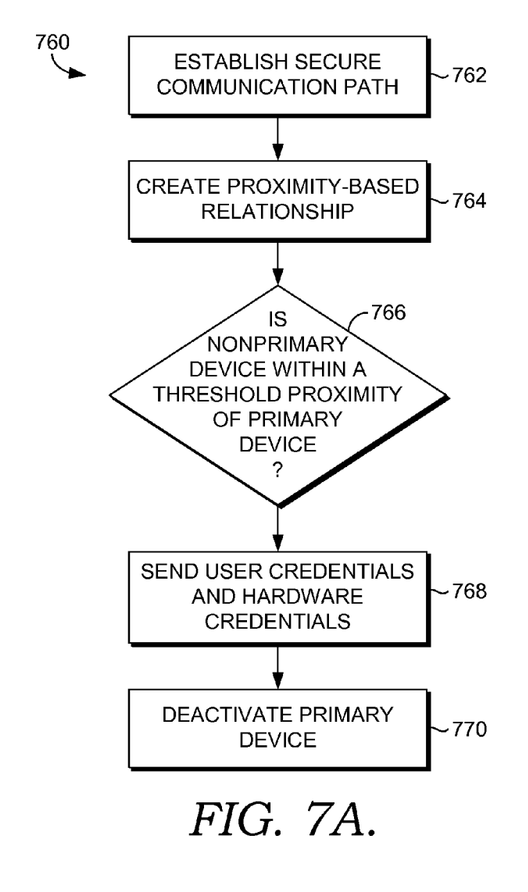
FIG. 7A depicts an illustrative flow diagram that depicts a method for receiving an incoming call on a target device according to an embodiment of the technology.

FIG. 7A depicts a flow diagram, referenced generally by the numeral 760, that illustrates a method for receiving an incoming call on a target device. At a step 762, a secure communication path is established between a primary device and a nonprimary device, while at a step 764, a proximity-based relationship is created between the primary device and the nonprimary device. At a step 766, it is determined if the nonprimary device is within a threshold proximity of the primary device. If so, at a step 768, a set of user credentials and a set of hardware credentials are sent from the primary device to the nonprimary device thereby activating the nonprimary device so that it is capable of receiving an incoming call. At a step 770, the primary device is deactivated so that it cannot receive an incoming call. If the nonprimary device is not within a threshold proximity of the primary device, no action is taken.

To summarize, this invention enables a nonprimary device to be activated by making use of near-field communication technology to communicate a set of user credentials and a set of hardware credentials from a primary device to the nonprimary device. Once activated the nonprimary device is capable of receiving incoming calls.

The different embodiments discussed above provide a wireless-telecommunications-network subscriber with an efficient and inexpensive way to utilize a variety of wireless-telecommunications devices for different purposes. For example, one embodiment of our technology allows a subscriber to request that the network activate a nonprimary device by associating a set of user credentials with the hardware credentials for the nonprimary device. Another embodiment of our technology leverages near-field communication technology to automatically send a request to the network to activate the nonprimary device when the nonprimary device is within a threshold proximity of the primary device. Yet another embodiment enables this activation process to occur independently of network involvement.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. In addition, although the disclosure might be under certain headings, it is not limited to only such embodiments.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, facilitate a method for automatically routing an incoming call to one active device of a set of wireless-telecommunications devices associated with a single wireless-telecommunications-network subscriber, the method comprising:
at the network:
receiving an indication that a proximity-based relationship between a primary device and a non-primary device has been created;
incident to receiving the indication that the proximity-based relationship between the primary device and the non-primary device has been created, receiving a first request communicated by the non-primary device to associate a set of network-assigned user credentials of the primary device with a set of hardware credentials associated with the non-primary device, the set of network-assigned user credentials uniquely identifying the subscriber to the network, the set of network-assigned user credentials comprising a mobile subscriber identifier and a network access identifier assigned by the network, the set of hardware credentials comprising one or more of an electronic serial number associated with the non-primary device, or a mobile equipment identifier associated with the non-primary device;
associating the set of network-assigned user credentials with the set of hardware credentials associated with the non-primary device to activate the non-primary device such that it is capable of receiving an incoming call, wherein a relationship between the set of network-assigned user credentials of the primary device and a set of hardware credentials associated with the primary device is maintained while the set of network-assigned user credentials of the primary device is associated with the set of hardware credentials associated with the non-primary device; and
incident to receiving an indication that the non-primary device is no longer within the threshold proximity of the primary device, receiving a second request to associate the set of network-assigned user credentials of the non-primary device with the set of hardware credentials associated with the primary device, wherein the second request is useable by a network to activate the primary device such that it is capable of receiving an incoming call.

2. The media of claim 1 further comprising subsequent to activating the non-primary device such that it is capable of receiving an incoming call and prior to receiving the indication that the non-primary device is no longer within the threshold proximity of the primary device, deactivating the primary device, thereby preventing it from being able to receive incoming calls.

3. The media of claim 2, wherein the proximity-based relationship comprises a relationship utilizing short-range wireless radio-frequency communication.

4. The media of claim 2, wherein the proximity-based relationship is created by either the network or by a communication between the primary device and the non-primary device.

5. The media of claim 2, wherein the threshold proximity is between 1 meter and 15 meters.

6. The media of claim 2, further comprising subsequent to receiving the second request to associate the set of network-assigned user credentials with the set of hardware credentials associated with the primary device, deactivating the non-primary device, thereby preventing it from being able to receive incoming calls.

7. The media of claim 2, wherein the second request is received from the primary device.

8. The media of claim 2, wherein either the primary device or the non-primary device is active at any one time.

9. The media of claim 2, wherein the primary device is deactivated once the set of network-assigned user credentials is associated with set of hardware credentials associated with the non-primary device.

10. Non-transitory computer-readable media having computer-executable instructions embodied thereon that, when executed, facilitate a method for automatically receiving an incoming call on a non-primary device, the method comprising:
   at a primary device;
   creating a proximity-based relationship between the non-primary device and the primary device when the primary device is within a threshold proximity of the non-primary device, wherein the primary device includes a set of hardware credentials that are associated with a set of network-assigned user credentials, the set of network-assigned user credentials uniquely identifying a subscriber to a network, the set of network-assigned user credentials comprising a mobile subscriber identifier and a network access identifier;
   incident to creating the proximity-based relationship, communicating a first request to the network to associate the set of network-assigned user credentials with a set of hardware credentials associated with the non-primary device; and
   receiving an indication that the network has associated the set of network-assigned user credentials with the set of hardware credentials associated with the non-primary device to enable the non-primary device to receive an incoming call, wherein the network maintains a relationship between the set of network-assigned user credentials of the primary device and the set of hardware credentials of the primary device while the set of network-assigned user credentials of the primary device is associated with the set of hardware credentials associated with the non-primary device; and
   incident to receiving an indication that the non-primary device is no longer within the threshold proximity of the primary device, communicating a second request to the network to associate the set of network-assigned user credentials of the non-primary device with the set of hardware credentials associated with the primary device, wherein the request is useable by the network to activate the primary device such that it is capable of receiving an incoming call.

11. The media of claim 10, wherein enabling the non-primary device includes enabling additional functionality beyond an ability to receive incoming call.

12. The media of claim 10, wherein the non-primary device comprises a device in an automobile or a smart appliance.

13. The media of claim 10, wherein a plurality of proximity-based relationships can be created between the primary device and a plurality of non-primary devices.

14. Non-transitory computer-readable media having computer-executable instructions embodied thereon that, when executed, facilitate a method of enabling a wireless-telecommunications-network subscriber to automatically receive calls on any of a certain set of multiple devices, the method comprising:
   at the network:
   receiving a first request from a non-primary device to activate the non-primary device, wherein the first request stemmed from the non-primary device coming within a threshold proximity of a primary device;
   associating a set of primary-device user credentials to a set of hardware credentials associated with the non-primary device, the set of primary-device user credentials assigned by the network and uniquely identifying the subscriber to the network, the set of primary-device user credentials comprising a mobile subscriber identifier and a network access identifier, the set of hardware credentials comprising one or more of an electronic serial number associated with the non-primary device or a mobile equipment identifier associated with the non-primary device, wherein a relationship between the set of primary-device user credentials of the primary device and a set of hardware credentials associated with the primary device is maintained while the set of primary-device user credentials is associated with the set of hardware credentials associated with the non-primary device; and
   activating the non-primary device after the set of primary-device user credentials have been associated with the set of hardware credentials associated with the non-primary device such that it is capable of receiving an incoming call; and
   incident to receiving an indication that the non-primary device is no longer within the threshold proximity of the primary device, receiving a second request to associate the set of primary-device user credentials with the set of hardware credentials associated with the primary device, wherein the second request is useable by the network to activate the primary device such that it is capable of receiving an incoming call.

* * * * *